United States Patent [19]
Bolton

[11] Patent Number: 4,739,411
[45] Date of Patent: Apr. 19, 1988

[54] FOCUS WARNING SYSTEM FOR A MANUALLY-FOCUSED STILL VIDEO CAMERA HAVING AN ELECTRONIC VIEWFINDER

[75] Inventor: Richard H. Bolton, Rushville, N.Y.

[73] Assignee: Eastman Kodak Company, Rochester, N.Y.

[21] Appl. No.: 940,317

[22] Filed: Dec. 10, 1986

[51] Int. Cl.$^4$ .......................................... H04N 5/232
[52] U.S. Cl. .................... 358/227; 358/213.13; 358/909; 358/228; 354/219; 352/137; 352/141
[58] Field of Search .................... 358/227, 228, 213.13, 358/225, 213.19, 224, 909, 335; 352/131, 141, 121, 137, 169; 354/195.13, 199, 219

[56] References Cited

U.S. PATENT DOCUMENTS

| | | | |
|---|---|---|---|
| 3,435,136 | 3/1969 | Bachmann et al. | 178/6.8 |
| 3,587,431 | 6/1971 | Holler | 95/44 |
| 3,605,596 | 9/1971 | Vockenhuber et al. | 95/44 |
| 3,820,882 | 6/1974 | Jakubowski | 352/131 |
| 4,124,857 | 11/1978 | Hauser et al. | 354/198 |
| 4,147,420 | 4/1979 | Iwata et al. | 354/127 |
| 4,219,261 | 8/1980 | Rosner et al. | 354/23 D |
| 4,221,475 | 9/1980 | Tamura | 354/25 |
| 4,238,154 | 12/1980 | Biber et al. | 354/198 |
| 4,239,357 | 12/1980 | Iida | 354/25 |
| 4,300,826 | 11/1981 | Aoki et al. | 354/60 L |
| 4,303,322 | 12/1981 | Someya | 354/31 |
| 4,313,657 | 2/1982 | Tokutomi et al. | 354/53 |
| 4,319,238 | 3/1982 | Ogasawara et al. | 340/753 |
| 4,336,987 | 6/1982 | Shenk | 354/195 |
| 4,341,451 | 7/1982 | Krueger et al. | 354/289 |
| 4,344,686 | 8/1982 | Stemme et al. | 354/198 |
| 4,354,754 | 10/1982 | Takahashi et al. | 354/289 |
| 4,361,390 | 11/1982 | Yamada | 354/198 |
| 4,371,245 | 2/1983 | Iwata et al. | 354/198 |
| 4,456,931 | 6/1984 | Toyoda et al. | 358/335 |
| 4,463,384 | 7/1984 | Fujikawa et al. | 358/227 |
| 4,481,540 | 11/1984 | Bergen | 358/227 |
| 4,502,771 | 3/1985 | Katsuma et al. | 354/289.1 |
| 4,503,508 | 3/1985 | Brooks et al. | 364/525 |
| 4,523,829 | 6/1985 | Eguchi et al. | 354/406 |
| 4,533,170 | 11/1985 | Aoki et al. | 358/225 |
| 4,558,368 | 12/1985 | Aoki | 358/228 |
| 4,571,627 | 2/1986 | Stempeck | 358/224 |
| 4,572,643 | 2/1986 | Akashi | 354/409 |
| 4,584,610 | 4/1986 | Mizokami et al. | 358/228 |
| 4,599,657 | 7/1986 | Kinoshita et al. | 358/335 |
| 4,668,991 | 5/1987 | Theuwissen et al. | 358/227 |
| 4,672,439 | 6/1987 | Florence et al. | |
| 4,704,022 | 11/1987 | Wozawa et al. | 354/219 |

OTHER PUBLICATIONS

Research Disclosure, 4/83, No. 22822, "Microprocessor Exposure Control", pp. 157–159.
Research Disclosure, 3/82, No. 21504, "Automatic Calibration of Microprocessor Clock Frequency", pp. 70–71.

Primary Examiner—Robert Lev
Attorney, Agent, or Firm—David M. Woods

[57] ABSTRACT

A manually-focused video camera provides a movie image for an electronic viewfinder and a still image for recording apparatus. A diaphragm in the optical section of the camera determines the optical aperture presented to incoming image light, which coincidentally establishes the depth of field in which the subject remains in focus. When the aperture necessary for a still image exceeds the aperture used for the movie image by, e.g., three aperture stops, a warning system in the camera produces a control signal. The existence of this signal indicates a potential focusing problem due to the disparity between aperture values and the reduced depth of field in the corresponding still image. The signal is used, e.g., to illuminate a warning element in the viewfinder or to insert a neutral density filter into the path of incoming light, in the latter case forcing the movie aperture to approach the still aperture and thereby causing the movie depth of field to approach the still depth of field.

16 Claims, 3 Drawing Sheets

FOCUS WARNING SYSTEM FOR A MANUALLY-FOCUSED STILL VIDEO CAMERA HAVING AN ELECTRONIC VIEWFINDER

BACKGROUND OF THE INVENTION

1. Field of the Invention

The present invention relates to the field of still video imaging, and especially to a focusing arrangement for a still video camera of the type that produces a movie image for an electronic viewfinder in addition to a still image for recording.

2. Description Relative to the Prior Art

A still video camera, by virtue of its inherent video processing capability, is well suited for combination with an electronic viewfinder (see, for example, the camera disclosed in U.S. Pat. No. 4,456,931). This combination is particularly advantageous for previewing the picture as it will actually appear subsequent to video processing. Such a camera operates in two modes: a movie mode for producing a moving video image in the viewfinder and a still mode for producing and recording a still image. The movie mode is comparable to the operation of any motion picture video camera. In such a camera, the photosensitive region of an image sensor is continuously irradiated by scene light. Since the exposure time is fixed to accord with the video image rate (e.g., 1/30th second), the amount of light striking the image sensor is controlled by regulating the optical aperture presented to the incoming light with an adjustable diaphragm.

In the still mode, it is desirable that both the exposure time and the optical aperture are controlled so as to vary, respectively, the length of exposure and the intensity of the light striking the image sensor. For example, in order to obtain a distinct still image of an object in motion, it is necessary to shorten the exposure time so as to prevent image blur. In shortening the exposure time it is ordinarily necessary to open the aperture so as to maintain the same total exposure. On the other hand, in order to obtain a distinct still image over a broad distance range, it is necessary to close down the aperture so as to extend the depth of field. Then the exposure time would have to be lengthened accordingly. The adjustments are thus interactive, that is, exposure time adjustments require corresponding aperture adjustments, and vice-versa, in order to maintain a correct exposure value.

In a manually focused video camera, an electronic viewfinder is also used to determine when the image is properly focused. The proper focus, however, is not a discrete distance but a range of distances through which the image is acceptably defined, i.e., a range determined by the depth of field for a particular focal length, optical aperture, and subject distance. An electronic viewfinder repeats images of the scene at the television frame rate, i.e., 1/30 second. This "exposure interval" dictates a particular lens aperture for the existing light condition and, therefore, establishes a particular depth of field for each subject distance. A special problem emerges when the viewfinder is used with a video still camera because the light condition that dictates a certain aperture . . . and thus a certain depth of field . . . for the electronic viewfinder may require an entirely different aperture for the still exposure (because the exposure interval may not be 1/30 second). Thus the depth of field for viewing may be an artificial indication of the actual picture-taking condition. The "real" depth of field may be considerably less than that observed in the viewfinder with the attendant possibility that a properly-focused subject in the viewfinder may be unfocused (that is, outside the range of focus) with respect to the recorded picture.

If one could reliably locate the central focus position for the displayed depth of field, the picture would be in focus for any aperture (that is, for any depth of field). Owing, however, to the small size of the display screen in the viewfinder and the limited bandwidth available for the display, differences between details shown on the viewfinder screen are not very sharp or clear. Searching for optimum focus, necessary in view of the depth of field considerations heretofore mentioned, is a procedure marked by uncertainty. Perhaps the most elegant solution is to use a ranging device, such as the ultrasonic generator suggested in U.S. Pat No. 4,463,384, and then to couple the distance measurement to an indicator in the viewfinder. A costly and complex ranging system, however, is undesirable if cost and simplicity are significant factors.

U.S. Pat. No. 4,481,540 suggests another arrangement for dealing with such focus problems, but without dependence upon a distance measuring device. Two versions of the video signal, one unmodified and the other blurred by a low pass filter, are applied to the viewfinder via a switching device controlled by the high frequency content of the video signal. The unmodified part of the image is switched to the display during the presence of high frequency content while the blurred part of the image is displayed otherwise. As the image is brought into focus, more unmodified image, and less of the intentionally blurred image, appears in the viewfinder.

The focusing arrangement in the U.S. Pat. No. 4,481,546 however, requires a special viewing mode that occupies the image field and otherwise detracts from the main purpose of the viewfinder . . . to observe the scene as recorded by the camera. Moreover, the relatively low bandwidth of the electronic viewfinder ordinarily limits the rendition of high frequency, well-focused picture information. The visually-observed difference between the blurred and the unmodified but focused image will often be insignificant, particularly in poor lighting. Furthermore, the switching between the blurred and unmodified image requires not only a low pass filter (for blurring) and an electronic switch, but also requires a focus-sensitive trigger for the switch. (In the case of the U.S. Pat. No. 4,481,540 the trigger signal is derived from an aperture correction circuit.) All of this again adds complexity and cost to the camera.

SUMMARY OF THE INVENTION

Though depth of field is a function of several variables, viz., the subject distance, the focal length of the lens, and the aperture presented to incoming image light, the effect of the transition between the movie and still modes can be reduced to the change caused by shifting from a viewfinder aperture to a still aperture. In many viewing situations, the value of this aperture adjustment is a satisfactory predictor of movie focusing conditions that might be unsuitable for a still picture. The prospective still aperture is compared with the current movie aperture in order to determine if the depth of field will be dramatically different for a still picture. If the difference is to the detriment of the still picture, this comparison provides a direct way to forecast focusing problems. Armed with this information, the camera may alert the user or otherwise minimize the disparity between the "viewing" and "taking" depths of field.

According to the invention, a video camera provides a movie image for viewing and a still image for recording. The camera further includes an optical section for establishing an optical aperture and for focusing image light coming through the aperture upon a light sensor, an electronic viewfinder connected to the light sensor for displaying the movie image, and a focus warning system for generating a control signal indicative of a focusing problem. The focus warning system is arranged to determine the aperture that is necessary for the movie image in the viewfinder. The aperture necessary for the still image is concurrently determined. The control signal is activated if the still aperture differs from the movie aperture, for example, exceeding the movie aperture by a predetermined amount such as three aperture stops.

In a camera having an optical section that operates at a plurality of focal lengths, the control signal can additionally be a function of the focal length setting of the optical section. For example, if the optical section includes a zoom lens, the control signal may be activated only when the focal length of the zoom lens is at some proportion of its fully extended value, that is, when the depth of field is an especially critical factor in focusing.

Once obtained, the control signal may be used for a variety of purposes. The control signal may illuminate a warning element in the electronic viewfinder so that a visual indication of a focusing problem is presented in its field of view. On the other hand, the problem may be addressed closer to its source: A neutral density filter is mounted for insertion into the path of image light directed toward the image sensor. With the activation of the control signal, instead of (or in addition to) putting a signal in the viewfinder the neutral density filter is inserted into the image light path thereby forcing the aperture to open to a larger value closer to the aperture necessary for the still image. The larger aperture will dictate a "viewing" depth of field similar to, in many cases, the "taking" depth of field.

BRIEF DESCRIPTION OF THE DRAWINGS

The invention will be described with reference to the drawings, in which.

DETAILED DESCRIPTION OF THE PREFERRED EMBODIMENT

Because video cameras including electronic viewfinders are well known, the present description will be directed in particular to elements forming part of, or cooperating more directly with, apparatus in accordance with the present invention. Elements not specifically shown or described herein may be selected from those known in the art.

Figure 1:
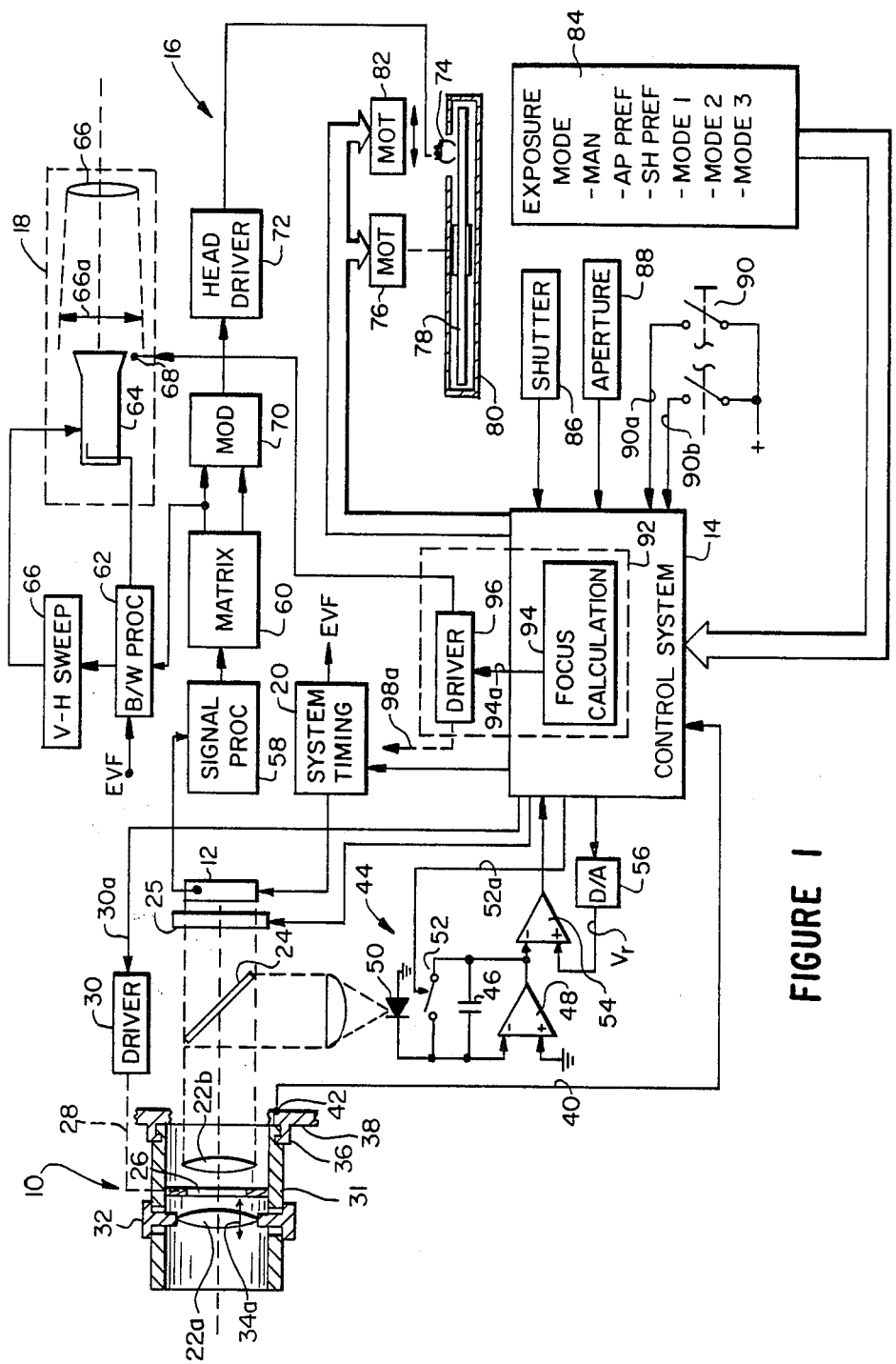
FIG. 1 is a block diagram of a still video camera incorporating a focus warning system according to the invention.

Referring initially to FIG. 1. the pertinent sections of a still video camera are shown for purposes of describing the invention. An optical section 10 directs image light to an imager 12, such as a conventional solid state inter-line transfer imager. A microprocessor control system 14 controls the general operation of the camera, including exposure control and focus warning. A signal processing and recording section is generally shown by the reference character 16. A monochrome electronic viewfinder 18 provides a monochrome rendition of the image being viewed by the optical section 10. A timing circuit 20 synchronizes the signal processing and recording section 16 with the imager 12 and, in particular, produces the signals for driving the imager 12.

The optical section 10 includes lens elements 22a and 22b for directing image light from a subject (not shown) toward the imager 12 through a partially transmissive mirror 24 and a conventional focal plane shutter 25. The shutter 25 is used to control exposure time in the still mode. In the movie mode the timing circuit 20 effectively determines the movie exposure interval by controlling the readout of the imager 12. A diaphragm 26 regulates the optical aperture (through which image light passes) by a mechanical linkage 28 with a diaphragm driver 30. The microprocessor control system 14 and the driver 30 are interconnected by a line 30a, over which the aperture setting is transmitted. The lens elements 22a and 22b and the diaphragm 26 are mounted within a lens barrel 31; the lens element 22a is further mounted within a focusing housing 32 which is capable of external adjustment (manual) for focusing an image of the subject on the imager 12. Such adjustment displaces the lens according to arrow 34a (by conventional means, for example, of cam action or a like type of displacement).

The optical section is schematically shown as an interchangeable lens having its barrel 31 attached to a bayonet mount 36 on a camera body (shown in part by the reference character 38). Though not specifically required in the practice of the invention, the focal length of the optical section 10 may be communicated on a line 40 to the control system 14 from an interconnection 42 with indicia on the lens barrel 31. Knowledge of the focal length is useful because the depth of field for short focal lengths (wide angle lens) is considerably broader than that of long (telephoto lens) focal lengths. Thus focusing is least critical for short focal lengths.

The optical section 10 also interacts with a microprocessor exposure control (MEC) circuit 44, which receives a sample of image light diverted by the mirror 24. The exposure control circuit 44 includes an integrator composed of a capacitor 46 connected between the inverting input and the output of an operational amplifier 48. The output of the amplifier 48 is an integral over time of a photocurrent produced by a photodiode 50 and applied to the inverting input of the amplifier 48. The photocurrent is proportional to the brightness of the image light diverted from the main optical path by the partially transmissive mirror 24. A reset switch 52 is connected across the capacitor 46 for resetting the circuit 44 according to the condition of a signal on a line 52a from the microprocessor control system 14.

The output voltage of the amplifier 48 increases until it equals a reference voltage $V_r$ provided to a comparator 54. When equality occurs, the output of the comparator 54, which is connected to the control system 14. changes state, thereby indicating the end of an integration cycle. The microprocessor control system 14 includes a software counter (not shown) which can be zeroed at the beginning of an integration cycle and stopped when the comparator 54 changes state. The value in the counter at that moment therefore represents the integration time, which corresponds to the brightness of the image light diverted upon the photodiode 50. The value of the reference voltage $V_r$ is output as a digital number from the microprocessor control system 14 and converted into an analog voltage by a digital-to-analog converter 56. The type of exposure control circuit employed is further described in U.S. Pat. No. 4,503,508 and Research Disclosure Items 21504 (March 1982, pages 70–71) and Item 22822 (April 1983, pages 157–159).

The video signal generated by the imager 12 is applied to a signal processing circuit 58, which separates the colors (red, green and blue) and applies gain, white balance and gamma correction to the signals. The color signals are applied to a matrix 60, which produces a luminance (Y) signal, and a line-sequential stream of color difference signals (B−Y, R−Y). The luminance signal is tapped at this point and directed through a monochrome signal processing circuit 62 to a conventional display tube 64 in the electronic viewfinder 18. The viewfinder display, which is controlled by a conventional vertical and horizontal sweep circuit 66, is activated according to the condition of a viewfinder signal EVF from the system timing circuit 20. The electronic viewfinder 18 also includes a viewing lens 66 for framing a field of view 66a that is visible to a user of the camera. The field of view 66a also includes a focus warning element 68 (such as a light emitting diode) interconnected to the control system 14.

The luminance signal and the color difference signals are input to a modulator 70, which provides a selected preemphasis to the input signals and frequency modulates a suitable set of carriers with the preemphasized signals. The modulated signal is amplified by a head driver circuit 72 and applied to a recording head 74. The recording portion of the section 16 includes a disk drive motor 76 for rotating a magnetic disk 78 adjacent the recording head 74. The disk is mounted for rotation within a cartridge housing 80, which has an opening that allows the recording head 74 to contact the disk 78 for recording a plurality of concentric tracks (which correspond to a plurality of images). The head 74 is moved by a stepper motor 82. Both the disk drive motor 76 and the stepper motor 82 are coupled to the microprocessor control system 14.

In the movie mode, the "exposure time" is fixed by operation of the system timing circuit 20 and the aperture is set to a value determined by the exposure control circuit 44 and the microprocessor control system 14. In the still mode, on the other hand, both exposure time and aperture may be varied. (The exposure time in the still mode is regulated by operation of the shutter 25.) One of several conventional exposure modes is selected by designating a unique input to the control system 14 from an exposure setting section 84 for the type of mode: including, for example, an aperture-preferred mode, a shutter-preferred mode, a manual mode, or one of several conventional program modes for emphasizing action photos, for emphasizing depth of field, or for compromising somewhere between the two preceding modes, and so on. Depending on the exposure mode in use, the exposure time is manually entered to the control system 14 from a shutter switch 86 and the aperture value is manually entered from an aperture switch 88.

The movie mode is initiated by partially depressing a two position shutter button 90 to its first position thereby setting a signal on a line 90a high. When the control system 14 senses that the signal on the line 90a is high, it causes the signal timing circuit 20 to issue the signal EVF to the monochrome processor 62, thus enabling the viewfinder 18. At this time, a reset signal is issued on the line 52a to start the exposure integration cycle. From the calculated integration time, the microprocessor control system 14 determines a movie aperture for currently operating the viewfinder; a still aperture and/or exposure time is also established for a prospective still exposure under the present light conditions according to the input from the exposure mode setting circuit 84 and the shutter and aperture switches 86 and 88. (The procedure and apparatus for determining a still aperture in conjunction with a movie aperture is disclosed in greater detail in commonly assigned, copending patent application Ser. No. 880,461, entitled "Exposure Control Apparatus for a Still Video Camera Having an Electronic Viewfinder," filed June 30, 1986.) The still exposure conditions (aperture and/or exposure time) are then stored by the control system 14 until called for. The still mode is initiated by further depressing the shutter button 90 until a signal on the line 90b is set high. The control system 14 then sets the diaphragm 26 via the driver 30 to the stored still aperture value and actuates the shutter 25 according to the stored exposure time.

The advantageous effects of the invention are obtained by operation of a focus warning section 92, which is shown to include a focus calculation procedure 94 within the control system 14 and a driver 96 interconnected with the control system 14 (and the procedure 94) by a control line 94a. The focus calculation procedure 94 receives information from the aforementioned sources, as follows. The exposure mode section 84 provides information as to the designated mode of still operation. The shutter switch 86 and the aperture switch 88 provide direct evidence of preferred shutter and/or aperture values. The exposure control section 44 provides a measurement of the brightness of the incoming image light. In addition, the focal length of the optical section 10 is available (if desired) from the connection 42. From this information the apertures required for the movie and still modes are calculated and, depending on the extent to which the still aperture departs from the movie aperture, a control signal CTR is provided on the line 94a to the driver 96. Ordinarily, a three stop difference (still mode aperture being greater) would trigger the control signal CTR. The existence of this signal indicates a likelihood of a focusing problem. Various actions may be taken in view of this signal. For example, upon receiving the control signal on the line 94a, the driver 96 may provide an activating signal to the warning element 68 in the field of view of the viewfinder 18. This alerts the user of the camera to a potentially significant focusing problem, which can then be treated by visually checking the distance setting on the lens barrel 30. Alternatively (or additionally), the driver 96 may provide a signal to some other part of the camera apparatus (as shown by the broken line 98a) for correcting the focusing problem in some other way, as will be seen in connection with FIG. 2.

Figure 2:
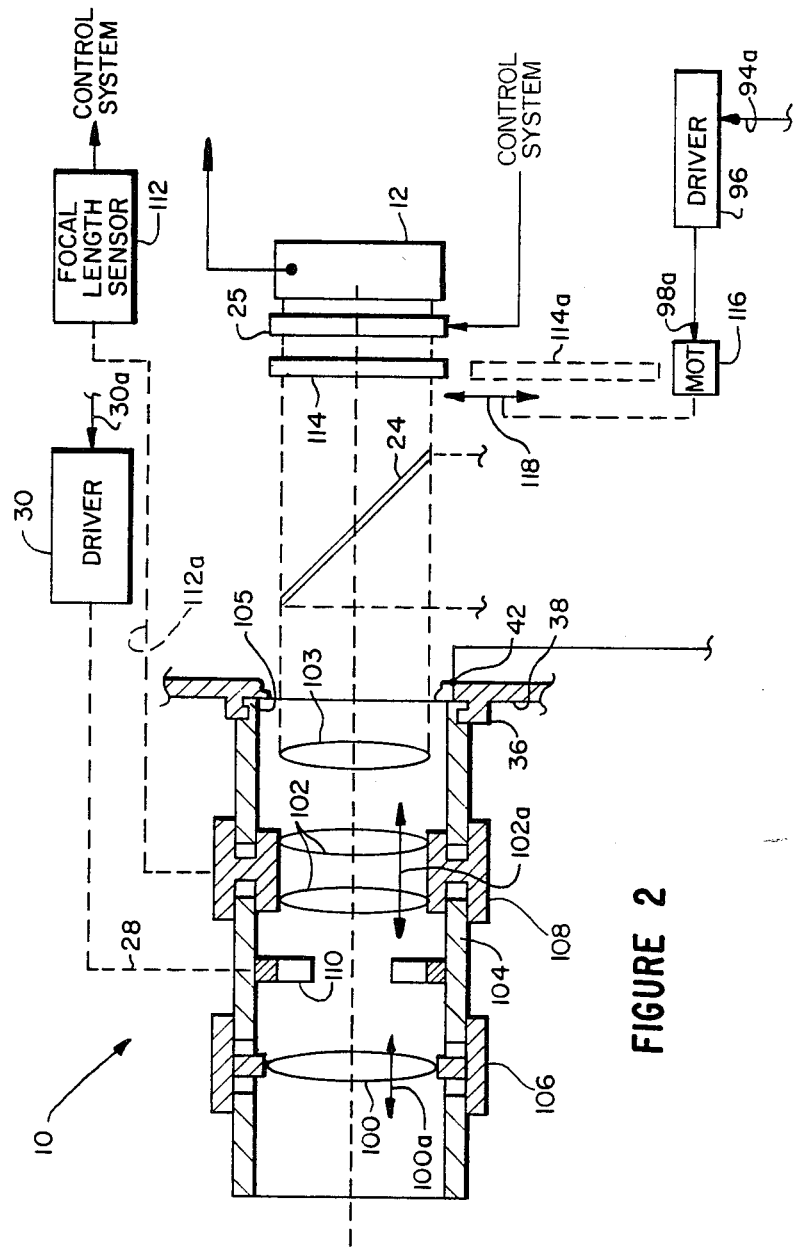
FIG. 2 is an illustration of a modification to the still video camera of FIG. 1, showing the use of a multiple focal length (zoom) lens and a neutral density filter.

In FIG. 2, the optical section 10 is shown in the configuration of a zoom lens. The optical section includes lens elements 100, 102 and 103. These elements are mounted within a lens barrel 104 having a bayonet fitting 105 for attaching to the bayonet mount 36 on the camera body 38. The optical element 100 is mounted for movement within a focusing section 106 (by, for example, conventional cam interaction between the barrel 104 and the section 106). The element 100 may be moved in a direction 100a by radially adjusting (manually) the focusing section 106. The lens elements 102 are mounted within a zoom section 108 such that they are movable longitudinally (by, for example, similar cam interaction) in a direction 102a by radially adjusting (manually) the section 108. The aperture opening presented to incoming image light is provided by a diaphragm 110 controlled by the diaphragm driver 30 (as described in connection with FIG. 1). The focal length sensor 112 provides an indication of the zoom focal length to the control system 14. (The interconnection 42, for lens identification, may thus become unnecessary although it is shown in FIG. 2.) The sensor 112 comprises any conventional sensing apparatus for detecting rotary motion relative to a lens mount. For example, a linear or rotary potentiometer can be provided within the zoom section 108; such a potentiometer includes a wiper that is driven by a cam or gear connected to the zoom movement. The broken line 112a between the zoom section 108 and the focal length sensor 112 represents conventional electrical contacts that are brought from the zoom section 108 to the camera body 38.

FIG. 2 also shows a neutral density optical filter 114 in the path of the image light directed to the image sensor 12. The filter 114 is movably mounted so that it can be moved from a position outside the optical path (shown by broken line 114a) to the position shown in FIG. 2. The actuating mechanism is shown as a motor 116 connected by the line 98a to the driver 96 in the focus warning section 92. When the control signal CTR is generated, the motor 116 thrusts the filter 114 into the optical path. This is done when a discrepancy between the movie aperture and the still aperture indicates a likely focusing problem. With the filter 114 blocking some of the light to the image sensor 12, the exposure control circuit 44 takes longer to integrate and the control system 14 therefore calls for a larger movie aperture value, in particular, one closer to the still aperture value. Thus the depth of field problem can be artificially overcome by forcing the viewfinder image to assume an aperture, and therefore a depth of field, closer to that which will be provided according to the still exposure conditions.

Figure 3:
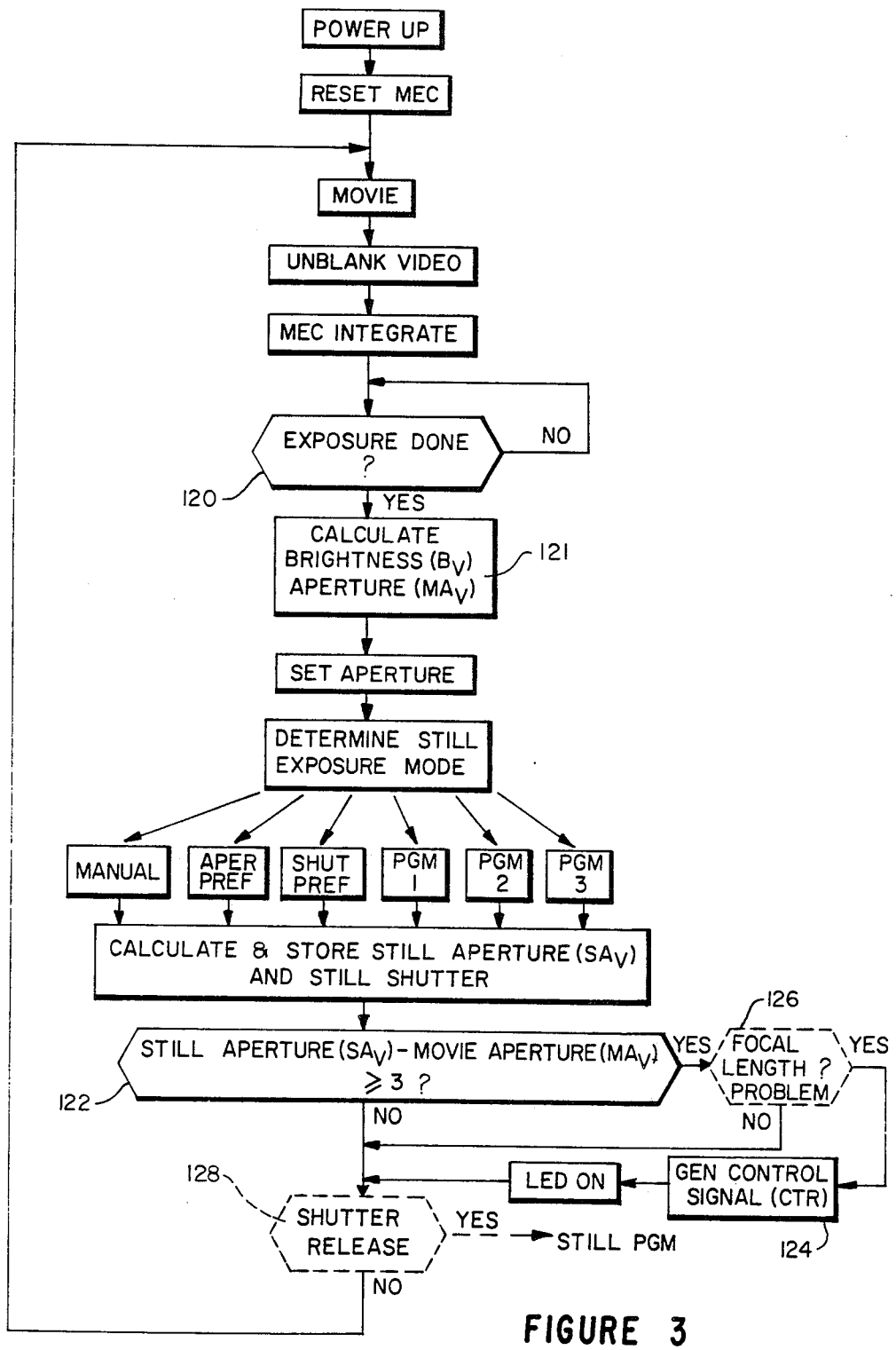
FIG. 3 is a flowchart showing operation of the focus warning system in accordance with the invention.

FIG. 3 is a flowchart of a typical procedure for operating the focus warning section 92 according to the invention. Once the power is on, the exposure control circuit (MEC) 44 is reset and the camera is put into the movie mode by partially depressing the shutter button 90. The viewfinder 18 is unblanked once the signal EVF is supplied to the monochrome processing circuit 62. At virtually the same time, the MEC circuit 44 begins to integrate light, continuing the integration until the exposure cycle is completed (as shown by the decision section 120 in the flowchart).

When the integration cycle is completed, a brightness value $B_v$ and a movie aperture value $MA_v$ are calculated. The brightness value $B_v$ is a function of the existing aperture value and the time that is taken to integrate to the reference voltage $V_r$. The new aperture value $A_v$ is then a function of the newly calculated brightness value $B_v$. Although these calculations may be done in a number of conventional ways, the following steps from the afore-mentioned Ser. No. 880,461 outline a typical procedure (the constants would be appropriately set by empirical determination):

(1) $N_v = \log_2 CNT$ (CNT=integration time);
(2) $B_v = MA_v - N_v + 10$ ($MA_v$=existing movie aperture);
(3) $MA_v = B_v - 1.0$ ($B_v$=new brightness).

The movie aperture is now set to the new aperture value $MA_v$.

The next step in the flowchart is to determine the still exposure mode from any one of the six available modes as set by the exposure mode circuit 84. The still aperture ($SA_v$) required for the still exposure depends upon the same brightness value as the movie aperture. As is well known, the still aperture ($SA_v$) may then be directly computed from the movie aperture value by accounting for the change (if any) in the exposure interval for the still exposure, i.e., a change in the exposure interval directly corresponds to an opposing change in the aperture so that the same amount of light reaches the imager 12. (If the still aperture is preset from the aperture switch 88 . . . i.e., in the manual or aperture preferred modes . . . then the foregoing aperture computation is unnecessary.) The still aperture ($SA_v$) is compared to the movie aperture ($MA_v$) in the aperture decision section 122. If the still aperture exceeds the movie aperture by a predetermined amount, for example, three aperture stops, then a critical focusing condition is predicted. The control signal CTR is generated and, in the procedure outlined in FIG. 3, the warning element (LED) 68 is turned on.

Since the extent of the focusing problem will depend on the focal length of the lens attached to the camera, an additional check (section 126) can be provided to determine the focal length of the attached lens. For example, for a wide angle lens the depth of field is such that an aperture difference of three stops, or even more, seldom puts the subject out of focus; therefore it may prove unnecessary to turn the LED 68 on and warn the user. On the other hand, for example, if a zoom lens is set to its longer telephoto focal length then for the same aperture difference a focusing problem is very likely to occur and the control signal CTR is accordingly generated. As shown in the broken line section 128 of the flowchart, if the shutter button 90 is fully depressed the procedure is directed toward a still program (not further shown) for executing the still exposure. Otherwise the flow returns to the beginning of the chart so that a new movie aperture ($MA_v$) and still aperture ($SA_v$) can be determined.

The invention has been described in detail with particular reference to a presently preferred embodiment, but it will be understood that variations and modifications can be effected within the spirit and scope of the invention. For example, a departure of three aperture stops in the still mode has been used as an indication of a focusing problem. Clearly other values can be used for this indication and the values may vary with the lens used, the focal length, and so on.

What is claimed is:

1. In a video camera providing a movie image for viewing and a still image for recording, the camera including an optical section for establishing an optical aperture and for focusing image light upon a light sensor, an electronic viewfinder connected to the light sensor for displaying the movie image, and a focus warning system for generating a control signal indicative of a focusing problem, the improvement in which said focus warning system comprises;

means for determining the aperture necessary for the movie image displayed in the viewfinder;

means for determining the aperture necessary for the still image; and means for activating the control signal when said still aperture differs from said movie aperture.

2. A video camera as claimed in claim 1 in which said control signal is activated when the difference between said still aperture and said movie aperture exceeds a predetermined value indicative of a significantly smaller depth of field for the still image.

3. A video camera as claimed in claim 2 in which said predetermined value corresponds to a difference of at least three aperture stops.

4. A video camera as claimed in claim 2 in which the optical section operates at a plurality of focal lengths, the additional improvement wherein the focus warning system comprises:

means responsive to the focal length setting of the optical section for generating a focal length signal corresponding to the present focal length setting of the optical section; and said activating means activates said control signal in response to predetermined values of said focal length signal in combination with said still aperture exceeding said movie aperture by said predetermined value.

5. A video camera as claimed in claim 1, the further improvement in which the electronic viewfinder includes a warning element in its field of view and said focus warning system includes means responsive to the control signal for operating said warning element so that it presents a visual indication of a focusing problem.

6. A video camera as claimed in claim 5 in which said warning element is a light emitting diode.

7. A video camera as claimed in claim 1, the further improvement in which the optical section includes a neutral density filter mounted for insertion into the path of image light directed to the image sensor and said focus warning system includes means responsive to the control signal for inserting said filter into the light path, thereby forcing the aperture provided for the movie image to open to a value closer to the aperture necessary for the still image.

8. A video camera as claimed in claim 1 in which said means for determining the still aperture is responsive to a manual aperture setting on the camera.

9. A video camera as claimed in claim 1 in which said means for determining the still aperture is responsive to image light.

10. In a video camera providing a movie image for an electronic viewfinder and a still image for recording apparatus, the camera including an optical section for establishing an optical aperture and for focusing image light passing through the aperture upon a light sensor, the signal input of the electronic viewfinder being connected to the light sensor for obtaining the movie image, the camera further including a focus warning system for generating an internal control signal indicative of a focusing problem, the improvement in which said focus warning system comprises:

means responsive to image light for determing the aperture necessary for the movie image in the viewfinder;

means for determining the aperture necessary for the still image; and means for activating the control signal indicative of a focusing problem when said still aperture exceeds said movie aperture by a predetermined amount.

11. A video camera as claimed in claim 10 in which said predetermined amount corresponds to at least two aperture stops.

12. In a video camera providing a movie image for an electronic viewfinder and a still image for recording apparatus, the camera accepting a plurality of interchangeable lenses that are separately identifiable by indicia that interconnect with the camera, each lens providing at least one focal length and having a diaphragm for establishing an optical aperture and a focusing element for focusing image light directed through the diagphragm toward a light sensor in the camera, the signal input of the electronic viewfinder being connected to the light sensor for obtaining the movie image, the camera further including a focus warning system for generating a control signal indicative of a focusing problem, the improvement in which said focus warning system comprises:

means responsive to the indicia of a lens for generating a focal length signal;

means responsive to the image light for determining the aperture necessary for the movie image in the viewfinder;

means for determining the aperture necessary for the still image; and means responsive in part to a selected focal length signal for activating the control signal when said still aperture departs from said movie aperture by a predetermined value corresponding to a reduced depth of field in the still image as compared to the movie image.

13. A video camera as claimed in claim 12, the improvement in which the electronic viewfinder includes a warning element in its field of view and said focus warning system includes means responsive to the control signal for operating said warning element so that it presents a visual indication of a focusing problem.

14. A video camera as claimed in claim 13 in which said warning element is a light emitting diode.

15. A video camera as claimed in claim 12, the improvement in which a neutral density filter is mounted for insertion into the path of image light directed to the image sensor and said focus warning system includes means responsive to the control signal for inserting said filter into the light path thereby forcing the aperture provided for the movie image to approach the aperture necessary for the still image.

16. A still video camera providing a movie image of a subject for an electronic viewfinder and a still image of the subject for recording apparatus, said camera comprising:

a light sensor;

optical means for directing image light upon said light sensor, said optical means including a diaphragm for establishing the optical aperture presented to the image light and focusing means for establishing the depth of field relative to the subject;

means responsive to the image light for determining a movie aperture value suitable for operation of the electronic viewfinder;

means for establishing a still aperture value suitable for recording a still image;

means for comparing the movie aperture value and the still aperture value;

means responsive to said comparing means for generating a control signal whenever the difference between said movie and still aperture values is large enough to reduce depth of field by a predetermined amount; and means responsive to said control signal for initiating a corrective procedure affecting the operation of said focusing means.

* * * * *